(12) United States Patent
Batchko et al.

(10) Patent No.: US 6,862,130 B2
(45) Date of Patent: Mar. 1, 2005

(54) POLARIZATION-INSENSITIVE INTEGRATED WAVELENGTH CONVERTER

(75) Inventors: Robert G. Batchko, San Francisco, CA (US); Larry R. Marshall, Mountain View, CA (US); Rostislav Roussev, Stanford, CA (US)

(73) Assignee: Lightbit Corporation, Inc., Mountain View, CA (US)

( * ) Notice: Subject to any disclaimer, the term of this patent is extended or adjusted under 35 U.S.C. 154(b) by 132 days.

(21) Appl. No.: 10/027,813

(22) Filed: Dec. 19, 2001

(65) Prior Publication Data

US 2002/0179912 A1 Dec. 5, 2002

Related U.S. Application Data

(60) Provisional application No. 60/267,658, filed on Feb. 9, 2001.

(51) Int. Cl.[7] .............................. G02F 1/35; G02B 6/126
(52) U.S. Cl. ........................ 359/326; 359/332; 385/11; 385/14
(58) Field of Search ................................ 359/326–332; 385/11, 14

(56) References Cited

U.S. PATENT DOCUMENTS

| | | | | |
|---|---|---|---|---|
| 5,946,129 A | * | 8/1999 | Xu et al. ...................... | 359/332 |
| 6,252,698 B1 | * | 6/2001 | Oikawa ........................ | 359/326 |
| 2001/0043390 A1 | * | 11/2001 | Kim et al. ................... | 359/344 |
| 2002/0141040 A1 | * | 10/2002 | Fujiura et al. .............. | 359/326 |

OTHER PUBLICATIONS

Yoo et al, "Multichannel Polarization–Independent Wavelength Conversion By Difference–Frequency Generation In AlGaAs Waveguides", Conference On Optical Fiber Communication (OFC 97), Paper TuO6, Dallas TX, Feb. 1997, pp. 78–80.*

Watanabe et al, "Interband Wavelength Conversion of 320 Gb/s (32×10 Gb/s) WDM Signal Using A Polarization–Insensitive Fiber Four–Wave Mixer", $24^{th}$ European Conference On Optical Communication (ECOC'98), Madrid SPAIN, Sept. 1998, pp 83–87.*

Brener et al, "Polarization–Insensitive Parametric Wavelength Converter Based On Cascaded Nonlinearities In LiNbO3 Waveguides", 2000 Optical Fiber Communication Conference, Paper TuF1, Baltimore MD, Mar. 2000, pp. 66–68.*

* cited by examiner

*Primary Examiner*—John D. Lee
(74) *Attorney, Agent, or Firm*—Ritter, Lang & Kaplan LLP (57) ABSTRACT

A polarization-insensitive integrated wavelength converter system includes polarization-separating, polarization-rotating and wavelength-converter structures integrated into a monolithic optical structure. In one embodiment, a lithium niobate waveguide structure includes an integrated polarization separator which comprises two coupled Zinc-diffused and annealed-proton-exchanged waveguides, an electro-optic quarter-wave retarder, a mirror structure and a quasi-phasematching structure. In another embodiment, an electro-optic half-wave retarder and bent waveguide are used in place of the electro-optic quarter-wave retarder and mirror structure. In a further embodiment, an optical circulator is used in conjunction with the waveguide structure in order to discriminate between input and output optical signals.

93 Claims, 8 Drawing Sheets

POLARIZATION-INSENSITIVE INTEGRATED WAVELENGTH CONVERTER

CROSS-REFERENCES TO RELATED APPLICATIONS

This application claims priority from U.S. Provisional Patent Application No. 60/267,658, filed on Feb. 9, 2001 entitled "Polarization Insensitive Integrated Optical Processor," the disclosure of which is hereby incorporated by reference in its entirety.

BACKGROUND OF THE INVENTION

Many integrated optical processors, such as wavelength converters based on waveguides in PPLN (Periodically-Poled Lithium Niobate), are sensitive to polarization modes of the interacting optical signals. These PPLN wavelength converters can receive one or more input signals at different frequencies $f_s$, and convert these signals to different frequencies $f_c$ with the help of energizing pump signals at frequencies $f_p$. The frequency $f_c$, of a converted signal is related to the frequency f, of its corresponding input signal and the frequency $f_p$ of its pump signal to provide a mechanism to define the frequencies of the converted signals from their input signals. However, PPLN wavelength converters are polarization sensitive and various physical effects in the processor can cause undesired results on an input signal of mixed polarization modes. These effects include dependence of the nonlinear coefficient and waveguide loss on the polarization of the interacting optical beams.

Optical systems designed to compensate for polarization sensitivity (e.g., systems that achieve "polarization diversity") are known in the art. However, many of these systems utilize multiple discrete optical components that are not suitable for practical integration into monolithic optical processing systems.

On the other hand, the present invention provides for which polarization-insensitive integrated wavelength converters with components and designs which can be efficiently integrated into monolithic optical systems. Costs can be reduced and reliability can be increased, among other improvements.

SUMMARY OF THE INVENTION

According to a further aspect of the invention, a polarizing beam splitter is utilized to couple different polarization modes of an input signal into an optical processing element and a bypass path.

According to another aspect of the invention, a waveguide polarization separator and converter, which utilizes a junction between two coupled waveguides, wherein each of the coupled waveguides have preferential transmission properties for TE and TM polarization modes thereby serving to separate the polarization modes of the component beams into two separate arms of a waveguide structure, and a wavelength converter used for performing wavelength conversion on at least one of the component beams.

According to another aspect of the invention, a component beam is processed, wherein the processing includes wavelength conversion by transmission of the component beam through a PPLN structure.

According to another aspect of the invention, a component beam is processed, wherein the processing includes amplification by transmission of the component beam through a PPLN structure.

According to another aspect of the invention, an optical filter serves to discriminate between converted and non-converted optical signals.

According to another aspect of the invention, an inter-channel crosstalk modulator serves to detect and reduce the level of interchannel crosstalk between converted optical signals.

According to another aspect of the invention, a mirror and quarter-wave plate are used to change polarization modes of the component beams so that both component beams are processed and then recombined to form a processed output beam.

According to another aspect of the invention, a half-wave plate and bent waveguide are used to change polarization modes of the component beams so that both component beams are processed and then recombined to form a processed output beam.

According to another aspect of the invention, an waveguide electrooptic wave plate is used to change the polarization mode of the component beams so that both component beams are processed.

According to another aspect of the invention, a waveguide electro-optic mirror is used to reflect a portion of the component beams into a polarization rotator and PPLN structure so that both component beams are processed.

According to another aspect of the invention, a waveguide electro-optic phase modulator is used to adjust the phase of at least one of the component beams so that both component beams are processed.

According to another aspect of the invention, a twisted fiber is utilized to change the polarization mode of the component beams so that each component is processed.

According to another aspect of the invention, techniques for eliminating polarization sensitivity are integrated in an optical frequency synthesizer and filter.

According to another aspect of the invention, multiple channels comprising polarization-insensitive integrated wavelength converters are integrated into a single monolithic system.

Other features and advantages of the invention will be apparent in view of the following detailed description.

DESCRIPTION OF THE SPECIFIC EMBODIMENTS

First, it should be noted that the present invention is described with reference to the drawings with the same or similar elements given the same reference numbers.

Figure 1A:
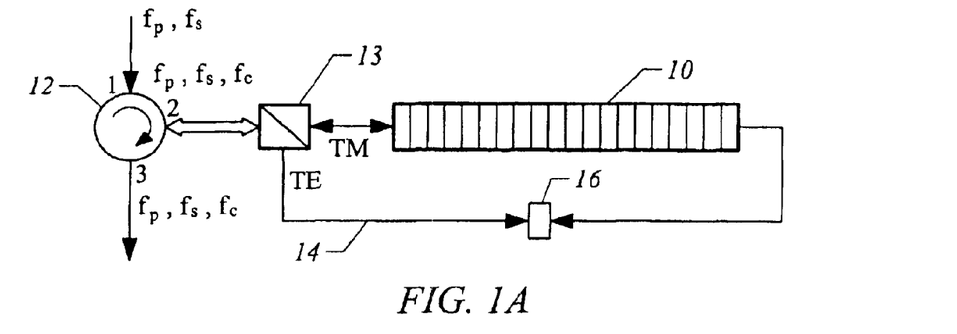
FIG. 1A illustrate the general arrangement of a polarization-insensitive integrated wavelength converter with block diagrams for its various elements, according to the one embodiment of the present invention.

Illustrative of the elements and their functions of the present invention, the general organization of one embodiment of the present invention is depicted in FIG. 1A. The polarization-insensitive integrated wavelength converter includes an optical circulator 12, a polarization beam splitter (PBS) 13, a difference frequency generator (DFG) in the form of a PPLN (Periodically-Poled Lithium Niobate) waveguide 10, an optical bypass path 14 and a half-wave plate 16.

The PPLN may utilize quasi-phasematching or other nonlinear optical phasematching processes in order to achieve three-wave mixing. While DFG is one nonlinear interaction enabled by three-wave mixing, other interactions, such as second harmonic generation (SHG), optical parametric amplification (OPA), optical parametric generation (OPG), and sum frequency generation (SFG) are also forms of wavelength conversion and as such may also be performed by the DFG. The PPLN may be comprised of ferroelectric, semiconductor, polymer, organic or other materials known to perform nonlinear optical frequency mixing. Other ferroelectric materials include congruent lithium niobate, congruent magnesium-doped lithium niobate, congruent lithium tantalate, congruent magnesium-doped lithium tantalate, stoichiometric lithium tantalate, stoichiometric magnesium-doped lithium tantalate, stoichiometric lithium niobate, stoichiometric magnesium-doped lithium niobate, KTP, BBO, and other known optical materials. Quasi-phasematching may be enabled in the PPLN by use of electric-field poling or other techniques for achieving periodic inversion of domains. In this fashion, phasematching between the pump, signal and converted signals may be achieved, and energy may be exchanged between the three waves, thereby enabling optical frequency conversion, or "wavelength conversion".

The optical circulator 12 has three ports so that optical signals received at port 1 are passed to port 2, optical signals received at port 2 are passed to port 3. The first port 1 of the circulator 12 receives one or more input signals at frequency $f_s$, and one or more energizing pump signals at frequency $f_p$. The first end of the PPLN waveguide 10, i.e., the DFG, is coupled to the second port 2 of the optical circulator through the PBS 13. The third port 3 is the output port of the polarization-insensitive integrated wavelength converter. Stated generally, the input signals and pump signals from port 1 of the circulator 12 are passed to the PPLN waveguide 10 which mixes the input signals and pump signals to generate converted signals. The PBS 13, the optical by-pass path 14, and the half-wave plate 16 operate on the polarization states of the optical signals for maximum efficiency of the integrated wavelength converter, and the resulting converted signals, input signals and pump signals are passed back through the PBS 13 to port 2 of the optical circulator 12, which passes all the optical signals out through port 3. This is indicated by the "$f_p$, $F_s$, $F_c$" in the drawings.

The polarizing beam splitter (PBS) 13 couples a component of light signals in a first polarization mode, in this example, the transverse magnetic (TM) mode, into the DFG waveguide 10 from port 2 and couples a component of light signals in the second polarization mode, in this example, transverse electric (TE), into the bypass path 14. Various types of PBS structures, such a proton exchange type or titanium (Ti) intersecting waveguides, are known in the art and are described in greater detail below. The bypass path 14 couples the second end of the DFG PPLN waveguide 10 to the PBS 13 and changes the polarization mode of an optical signal that traverses it. In this embodiment, the bypass path 14 includes a half-wave plate 16 which, as is well known in the art, rotates linearly polarized light 90° to convert light from one linear polarization mode to the other. The DFG waveguide 10 performs second-order mixing to generate converted light signals having frequencies $f_c$ equal to linear combinations of the input signal frequency $f_s$, and pump frequency $f_p$.

Operationally, the pump and input signals received by first port 1 of the optical circulator 12 are coupled to the PBS 13 through second port 2. The first signal component (TM) of these signals is coupled into the DFG waveguide 10 at its first end and the second signal component (TE) of the signals is coupled into the bypass path 14. The first component pump and input signals are mixed in the DFG waveguide 10 to form a first component (TM) of a converted signal which is coupled into the bypass path 14 at the second end of the waveguide 10 to be propagated back to the PBS 13. When the first signal component propagates through the half-wave plate 16, it is switched from the TM to the TE polarization mode. The second signal component (TE) from the PBS 13 has its polarization mode is switched from TE to TM in the bypass path 14 by the half-wave plate 16 and is then coupled into the DFG waveguide 10 at its second end to traverse the waveguide 10 in the opposite direction of the first signal component. The DFG PPLN waveguide 10 mixes the second signal component of the input signal and pump signal to form a second component of the converted signal.

The first and second components of the converted signal are recombined at the PBS 13 and coupled into the second port of the optical circulator 12 and are then passed to the third port as output, along with any remaining input signals and pump signals.

The optical path length of the bypass path 14 (including the half-wave plate 16) is set to be equal to the optical path length of the DFG waveguide 10 to assure that the recombined components are in phase. This can be done by controlling the index of refraction and physical length of the path 14, as is well-known in the art.

Only one polarization mode is passed through the DFG waveguide 10, in this case TM, so that the DFG is completely insensitive to the initial polarization states of the input signal and pump signals. A variation of the polarization-insensitive integrated wavelength converter places the half-wave plate 16 at the second end of the DFG waveguide 10, rather than separated in the by-pass path 14 as shown in FIG. 1A.

Figure 1B:
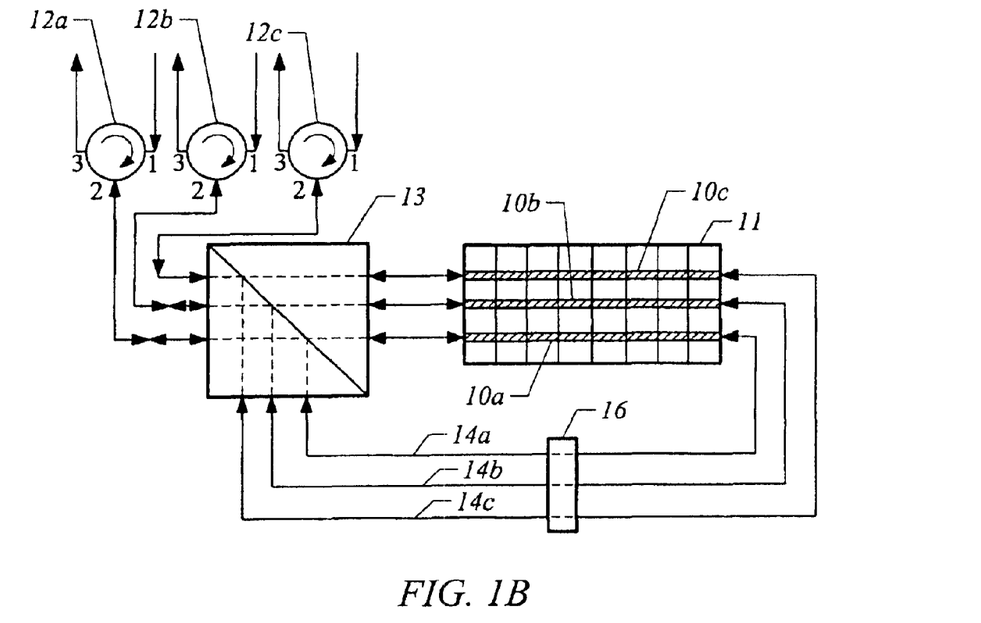
FIG. 1B is a multi-channel version of the FIG. 1A polarization-insensitive integrated wavelength converter.

FIG. 1B depicts a multi-channel system similar to that disclosed in FIG. 1A. Three optical circulators 12a, 12b and 12c receive three sets of input signals and pump signals. The PBS 13 is coupled to the second port 2 of the optical circulators 12a, 12b and 12c to create a plurality of channels, which is each coupled to a DFG waveguide 10a, 10b and 10c in a single PPLN structure (in this embodiment) 11 for generating converted signals from the input and pump signals of each channel. A plurality of bypass paths 14a, 14b and 14c and a half-wave plate 16 connect, respectively, the output of the DFG waveguides 10a, 10b and 10c to the PBS 13. The converted signals (and input and pump signals) of each channel are passed to the second port 2 and out the third port 3 of one of the optical circulators 12a, 12b and 12c.

The DFG can be either pumped at the pump wavelength, which is typically around 775 nm for performing wavelength conversion in the WDM C-band. Alternatively, the DFG can operate in a cascaded second-harmonic-generation-difference frequency-generation (SHG:DFG) process. In this fashion, the DFG is pumped at the subharmonic (or fundamental) of the pump wavelength, typically around 1550 nm for wavelength conversion in the WDM C-band, wherein the DFG serves to both produce the 775 nm pump light by second harmonic generation (SHG) as well as wavelength conversion by difference frequency generation. The structure depicted in FIG. 1B is well-suited to integration into a monolithic substrate so that multiple optical signals can be converted in parallel without regard to the polarization states of the input signal and pump.

Figure 2A:
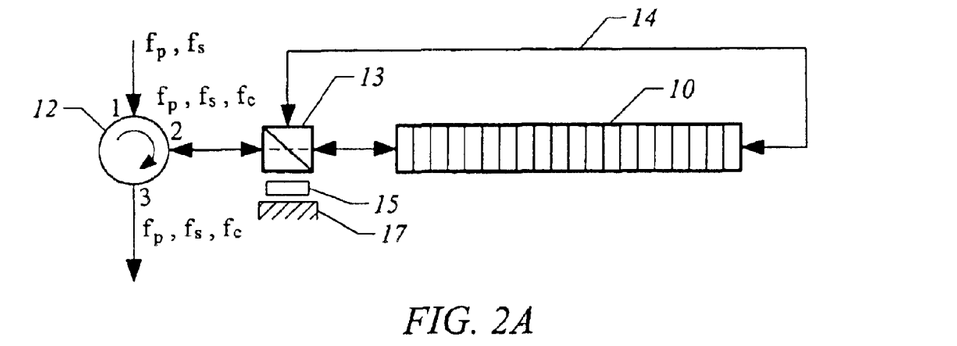
FIG. 2A illustrate a variation of the FIG. 1A wavelength converter in which a quarter-wave plate and mirror are substituted for a half-wave plate.

Another embodiment of the invention is depicted in FIG. 2A, the structure of which is similar to the embodiment depicted in FIG. 1A. However, in this embodiment the bypass path 14 maintains the polarization mode of the light signal it propagates. Polarization mode changing is done by a quarter-wave plate 15 and a mirror 17. The PBS 13 couples a first signal component (TM) to the first end of the DFG waveguide 19. The second signal component (TE) is transmitted through the quarter-wave plate 15 and is reflected back by the mirror 17 through the quarter-wave plate 15, and coupled into the bypass path 14. The two traversals of the quarter-wave plate 15 are equivalent to one traversal through a half-wave plate so that the polarization state of the second signal component is switched from TE to TM. The second signal component is then coupled into the second end of the DFG waveguide 10 so only TM components are converted in the DFG waveguide 10, as explained with respect to FIG. 1A, and the system is insensitive to the polarization modes of the initial pump and signal.

Figure 2B:
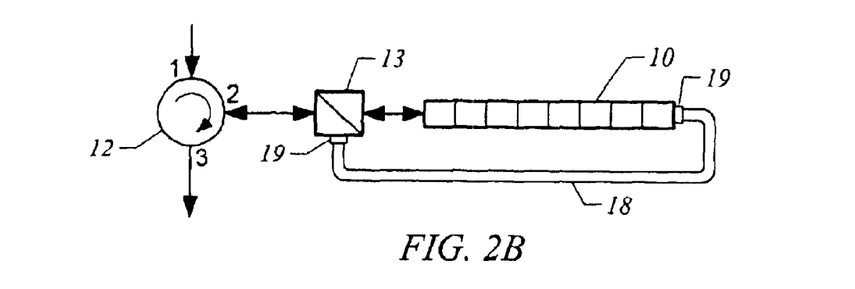
FIG. 2B illustrates another variation of the FIG. 1A wavelength converter in which a twisted optical fiber is used for the by-pass path and half-wave plate.

Another embodiment similar to the embodiment of FIG. 1A is depicted in FIG. 2B. The bypass path is formed of an optical fiber 18 which is twisted by 90° to switch the polarization mode of an optical signal propagating in the bypass path. A polarization-maintaining fiber can be used for the optical fiber 18. Substrate-to-fiber couplers 19 connect the two ends of the of the fiber 18 to the second end of the DFG waveguide 10 and the PBS 13 respectively.

It is known in the art that PPLN wavelength converters enable the simultaneous conversion of multiple channels (or "signals"). However, depletion of pump energy may result in interchannel cross-talk between converted channels. Therefore, a pump and signal monitor module can be utilized to monitor power levels of the pump, input and converted channels. Amplifiers and or modulators can be also utilized to control power levels of the pump and/or channels to reduce interchannel or other forms of crosstalk and signal degradation. Further, a feedback loop and module may be utilized to monitor and manage the power control process. Furthermore, the gain of the PPLN wavelength converter may be adjusted to control crosstalk. In this fashion, the PPLN crystal temperature, quasi-phasematching grating period, angle, and other properties of the PPLN crystal may be modified in order to control the nonlinear optical gain of the PPLN. Also, an electric field, applied to electrodes in the region of the waveguide, may be utilized to control the gain in this regard.

Figure 3:
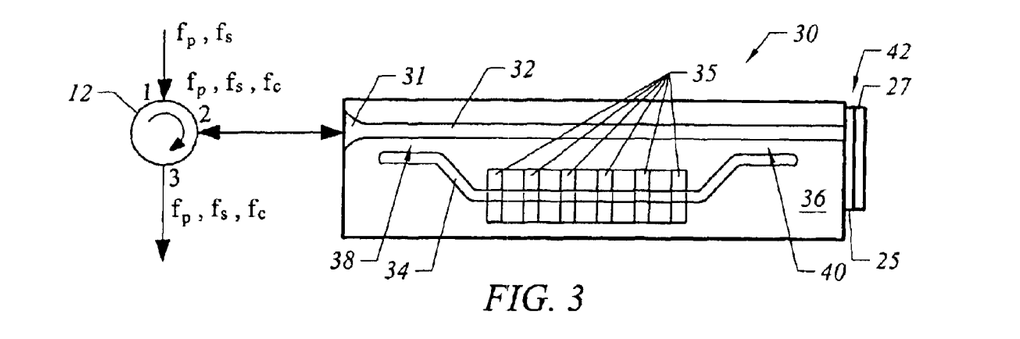
FIG. 3 is a block diagram of an embodiment of a polarization-insensitive integrated wavelength converter with coupled Ti and APE waveguides in a substrate and a polarization mode switching structure attached to the substrate, according to the another embodiment of the present invention.

In the embodiment depicted in FIG. 3, the capability of the present invention for integration is better illustrated. The optical circulator 12 is coupled to the input of a wavelength converter structure 30 which has a Ti waveguide 32 and a DFG formed of an Annealed Proton Exchanged (APE) waveguide 34 in an $LiNbO_3$ substrate 36. Ti-diffused $LiNbO_3$ waveguides are widely used because of their good optical properties and are formed by diffusing titanium (Ti) into a lithium niobate ($LiNbO_3$) substrate. Ti waveguides can be designed to propagate both modes of polarization. APE waveguides are formed by masking the surface of a $LiNbO_3$ substrate to define a waveguide area, immersing the waveguide in a bath of liquid acid that provides a source of protons to be exchanged with lithium ions to create a thin layer of protons at the surface, and annealing the structure to redistribute proton and lithium ions to form a stable waveguide structure. The APE waveguide can be designed to propagate only the TM mode of polarization.

The APE waveguide 34 includes PPLN structures 35 for mixing the pump and input signal to form a converted signal. Couplers are formed at each end of the APE waveguide; in this embodiment the Ti and APE waveguides 32 and 34 are brought close together to form first and second junctions 38 and 40 which effect evanescent coupling between the waveguides 32 and 34. The Ti waveguide 32 is terminated at one end by a polarization switching structure 42, which in this embodiment is a quarter-wave plate 25 and a mirror 27. The other end of the Ti waveguide 32 has an enlarged coupling region 31 to facilitate the coupling between the second port 2 of the circulator 12 and the waveguide 32.

The Ti waveguide can alternatively utilize any waveguide material, instead of titanium, that is generally known to support both TM and TE modes of polarization; for example, zinc (Zn), and other metals diffused into lithium niobate support such modes. Likewise, the APE waveguide may utilize other materials that support a single, TE or TM, polarization mode. As is known in the art, APE waveguides only support propagation of light signals in the TM mode. In the operation of the FIG. 3 wavelength converter, the input and pump signals are coupled into the first end of the Ti waveguide 32 by port 2 of the optical circulator 12. At the first junction 38 a first signal component in a TM polarization mode is coupled into the APE waveguide 43 and a second component in a TE polarization mode propagates through the Ti waveguide 32. In the APE waveguide 34, the pump and input signals are mixed to form a first component of the converted signal and the first component of the converted signal is coupled back into the Ti waveguide 32 at the second junction 40. Both signals have their polarization modes switched by the mirror 27 and quarter-wave plate 25 and are then coupled back into the second end of the Ti waveguide 32 to propagate in the opposite direction.

The second component, now in a TM polarization mode, is coupled into the APE waveguide 32 at the second junction 40 and the input and pump signals are mixed to form a second component of the converted signal. The second component of the converted signal is coupled back into the Ti waveguide 32 at the first junction 38 and both components of the converted signal are output to the second port 2 of the optical circulator 12 to be passed to the output port 3. Because both components of the signal and pump are converted in the TM mode in the APE waveguide DFG structure 35, the conversion process is independent of the polarization modes of the initial pump and signal.

Additionally, an optical circulator may be integrated into the structure along with the wavelength converter, polarization rotator, polarization separator, and other elements. In this fashion, an integrated circulator may comprise a polarization separator based on waveguides that discriminate TM and TE polarization modes, as described above, and a magneto-optic or other nonreciprocal optical element, such as a Faraday rotator, that rotates polarization in a direction dependent upon the direction of propagation of light through the element.

Figure 4A:
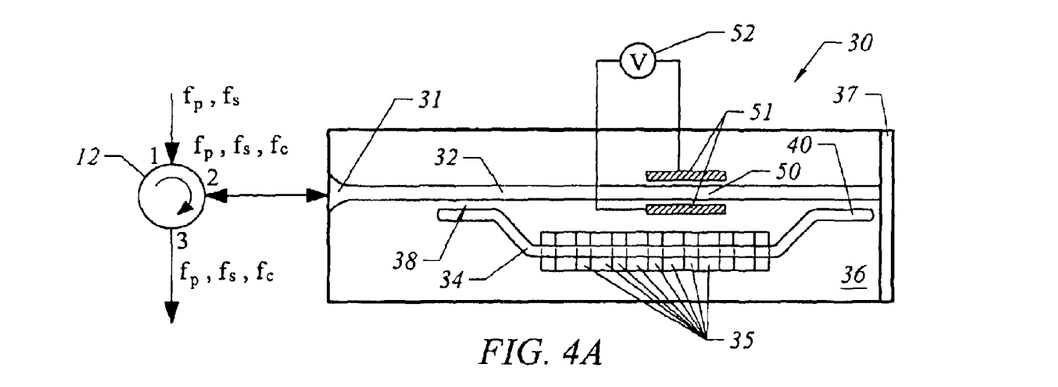
FIG. 4A illustrates a variation of the FIG. 3 polarization-insensitive integrated wavelength converter in accordance with the present invention.
Figure 4B:
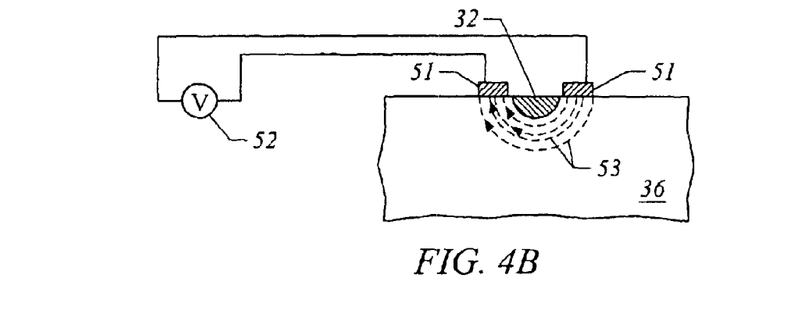
FIG. 4B is a cross-sectional view of the half-wave electro-optic region 50 in the FIG. 4A wavelength converter.

FIG. 4A depicts a variation of the FIG. 3 wavelength converter where a different technique are utilized to change the polarization mode of the signal components. In FIG. 4 a simple mirror 37 terminates one end of the Ti waveguide 32. Additionally, a half-wave electro-optic region 50 is disposed along the Ti waveguide 32 between the first and second coupling junctions 38 and 40 and two electrodes 51 on the surface of the substrate 36 and on either side of the Ti waveguide 32. The two electrodes 51 are connected to a voltage source 52. As is known in the art, the application of voltage to the half-wave electro-optic region 50 causes the switching of the polarization mode of an optical signal propagating through the region. The changing of the polarization mode in the electro-optical region 50 is controlled by length and composition of the region along the waveguide 32 with well-known techniques. FIG. 4B illustrates the cross-sectional view of the half-wave electro-optic region 50 and the electric fields (represented by dotted lines 53) created in the substrate 36 and the Ti waveguide 32 by the electrodes 51. The mirror 37 and half-wave electro-optic region 50 operate as the polarization switching structure 42 in FIG. 3.

Figure 5A:
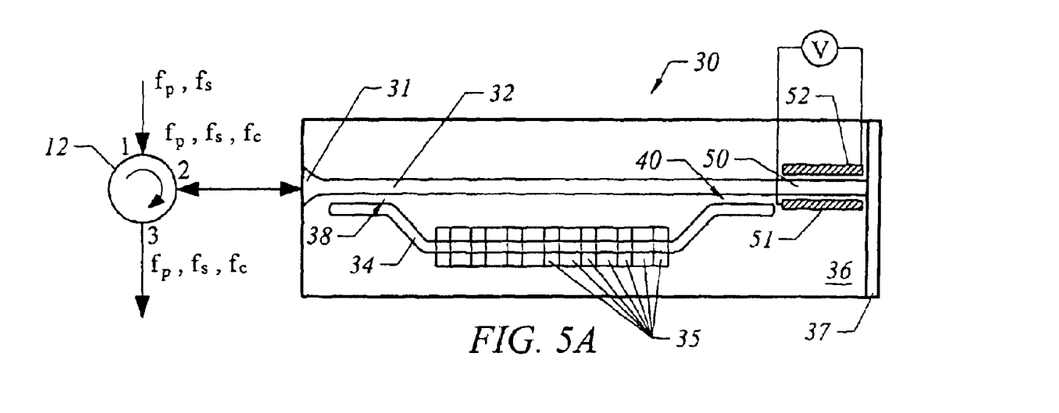
FIGS. 5A–5C show variations of the FIG. 3 polarization-insensitive integrated wavelength converter in accordance with the present invention.
Figure 5B:
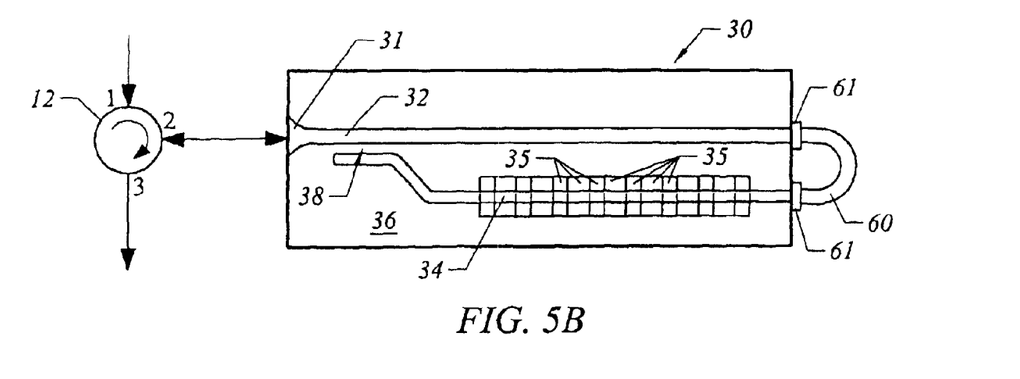
Figure 5C:
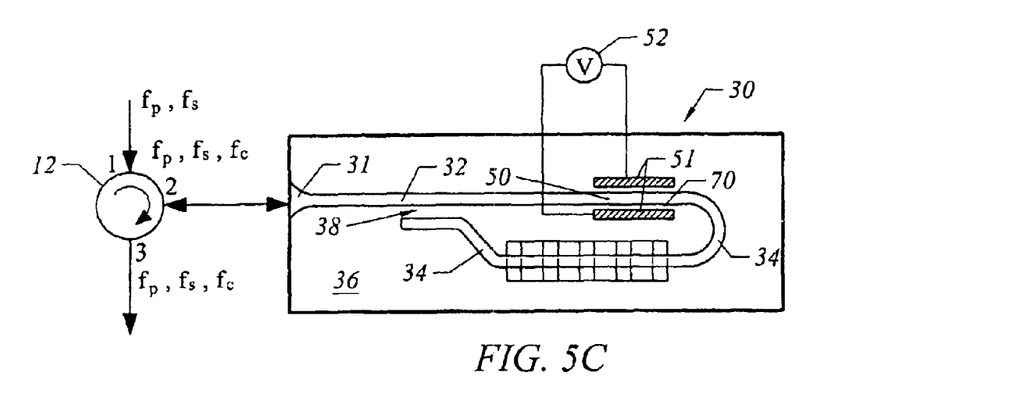

FIGS. 5A–5C illustrate further polarization-independent converters in which still more techniques are used to change the polarization mode of the signal components. In FIG. 5A a quarter-wave electro-optic region 50 is disposed between the second coupling junction 40 and the mirror 37. Both components propagate twice through the quarter-wave electro-optic region 50 so that their polarization modes are switched.

The wavelength converter in FIG. 5B uses a twisted fiber in a manner like the wavelength converter illustrated in FIG. 2B. Instead of a mirror at the second ends of the Ti and APE waveguides 32 and 34, the second ends are coupled by an optical fiber 60 twisted by 90° to induce a change in the polarization modes of the signal components. Substrate-to-fiber couplers 61 connect the two ends of the fiber 60 to the substrate 36 and to the second ends of the Ti waveguide 32 and APE waveguide 34.

In FIG. 5C the Ti waveguide 32 is coupled to the APE waveguide 34 at a first junction 38 and an intersection 70. As before, the APE waveguide 34 includes a PPLN section 35 for difference frequency generation (DFG) and extends around to the intersection 70. The Ti waveguide 32 include a half-wave electro-optic region 50 disposed before the intersection 70 with the APE waveguide 34. In operation, the input signal and pump signal are coupled into the Ti waveguide 32 at the enlarged coupler section 31 and first components of the input signal and pump (TM) are coupled into the APE waveguide 34 at the first junction 38. The first components are frequency mixed, exit the APE waveguide 34 into the Ti waveguide 32 at the intersection 70, and are polarization mode switched to TE when they propagate through the electrooptic region 50. In the opposite direction, the second components of the input signal and pump signals are polarization switched to TM when they propagate through the electro-optic region 50 and are coupled into the APE waveguide 34 at the intersection 70. The second components of the signal and pump are frequency mixed by the PPLN section 35 and are coupled to the Ti waveguide 32 at the first junction 38 before being sent back to the second port 2 of the circulator 12.

In all of the embodiments in FIGS. 3, 4, 5A–5C, the optical path lengths of the waveguides are adjusted with techniques known in the art so that the first and second components of the signals are in phase when recombined.

Figure 6:
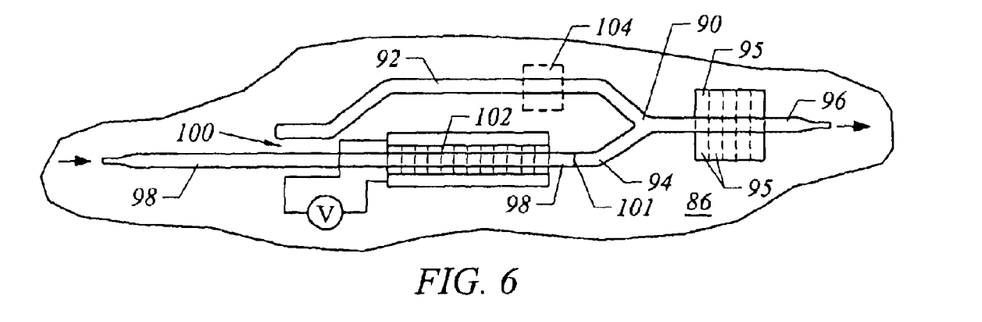
FIG. 6 depicts another embodiment of a polarization-insensitive integrated wavelength converter utilizing coupled Ti and APE waveguides and a polarization mode switching structure.

Another embodiment of the present invention is illustrated in FIG. 6 in which a wavelength converter structure is defined in a substrate 86. The structure has an APE Y-junction 90 includes first and second legs 92 and 94 joined into a single waveguide 96 which includes a PPLN section 95 for performing DFG. A Ti waveguide 98 is disposed near a curve in the first leg 92 of the APE Y-junction to form a first coupling junction 100 and terminates at an intersection 101 with the second leg 94 of the APE Y-junction 90. The Ti waveguide 98 also includes a electro-optic region 102 for changing the polarization mode of a light signal propagating in the Ti waveguide. The electro-optic region 102 is formed from electrodes and a connected voltage source, as described previously for other wavelength converter structures.

Operationally, the pump and input signal (an optical circulator is not shown) are coupled into one end of the Ti waveguide 98 and the first component of these signals (TM) is coupled into the first leg 92 of the APE Y-junction 90 at the first coupling junction 100. The second signal component (TE) has its polarization mode switched by the voltage electrodes in the polarization mode switching section 102 of the Ti waveguide 98 so that the second component is switched to the TM mode. The second component then enters the second leg 94 of the APE Y-junction 90 through the intersection 101 in the TM mode. Both components are then joined by the Y-junction 90 and propagate through the mixing PPLN region 95 in the TM state. Thus, the conversion process does not depend on the polarization modes of the initial signal and pump. Since it is critical that the signal components be in phase when joined by the Y-junction 90, the APE leg 92 includes a phase matching section 104 (the techniques of which are well known in the field) to adjust the phase of the first component to take into account phase changes induced in the second component as it propagates through the Ti waveguide.

Figure 7A:
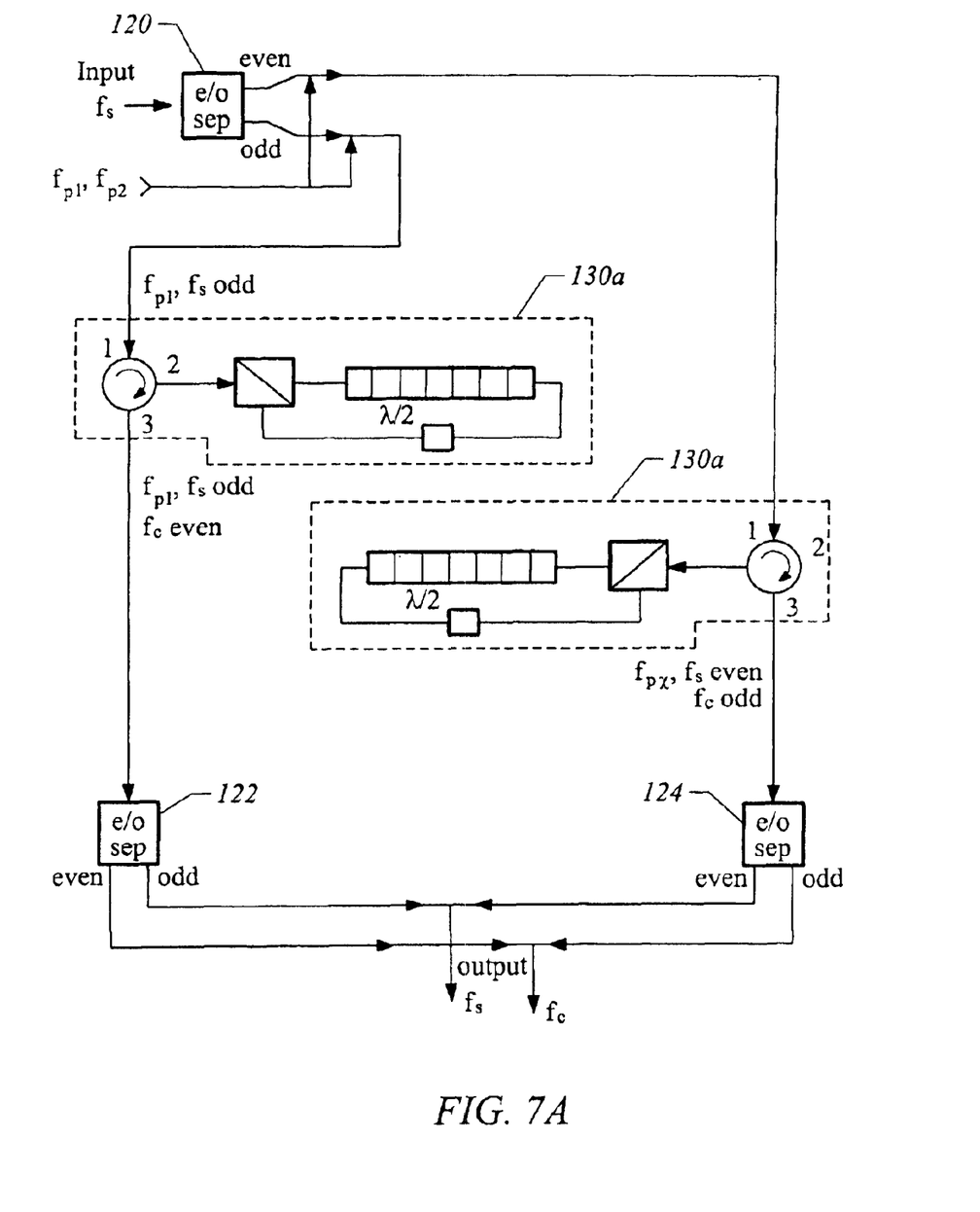
FIGS. 7A–7C illustrate applications of polarization-insensitive integrated wavelength converters in a filter system, in accordance with the present invention.
Figure 7B:
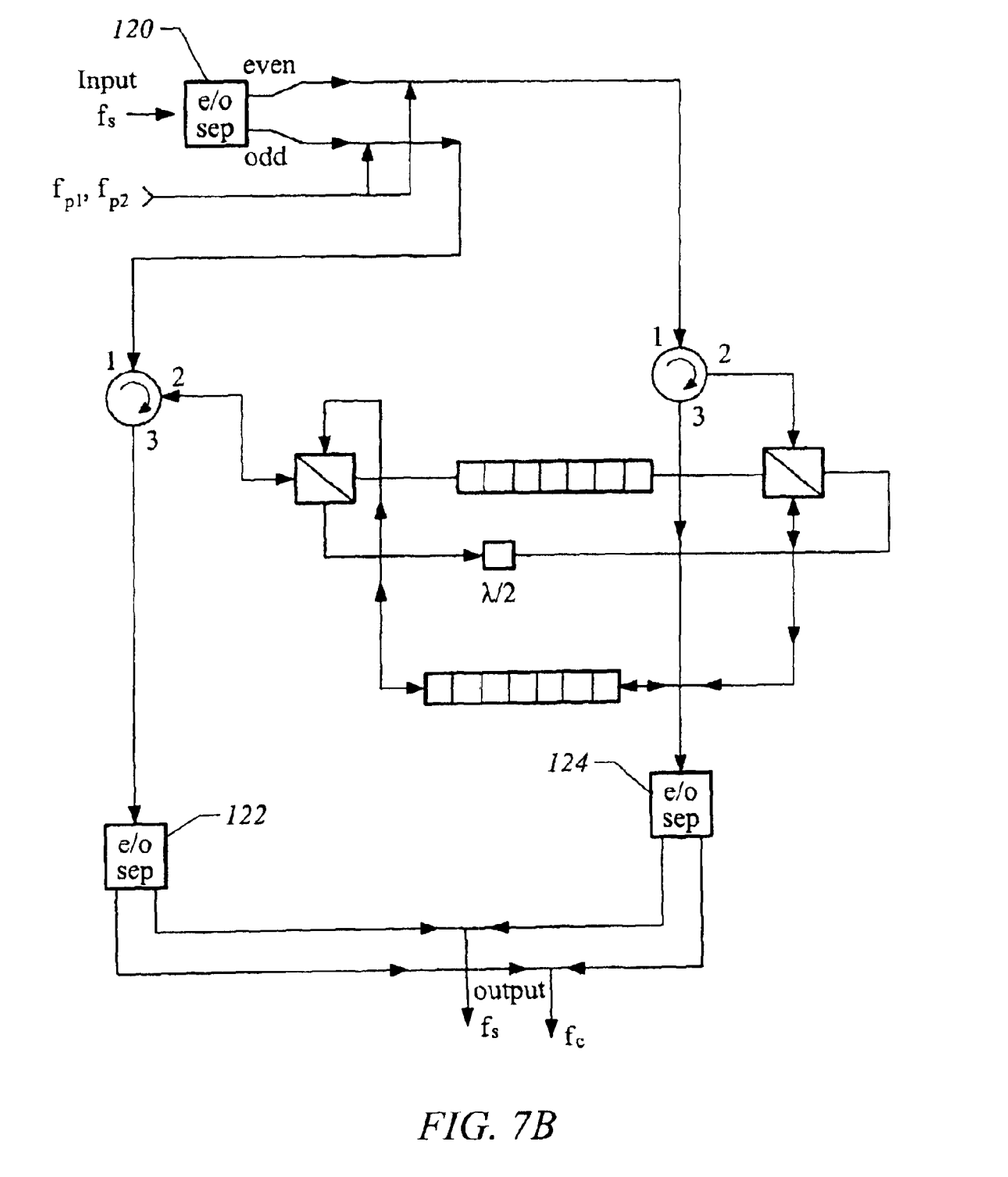
Figure 7C:
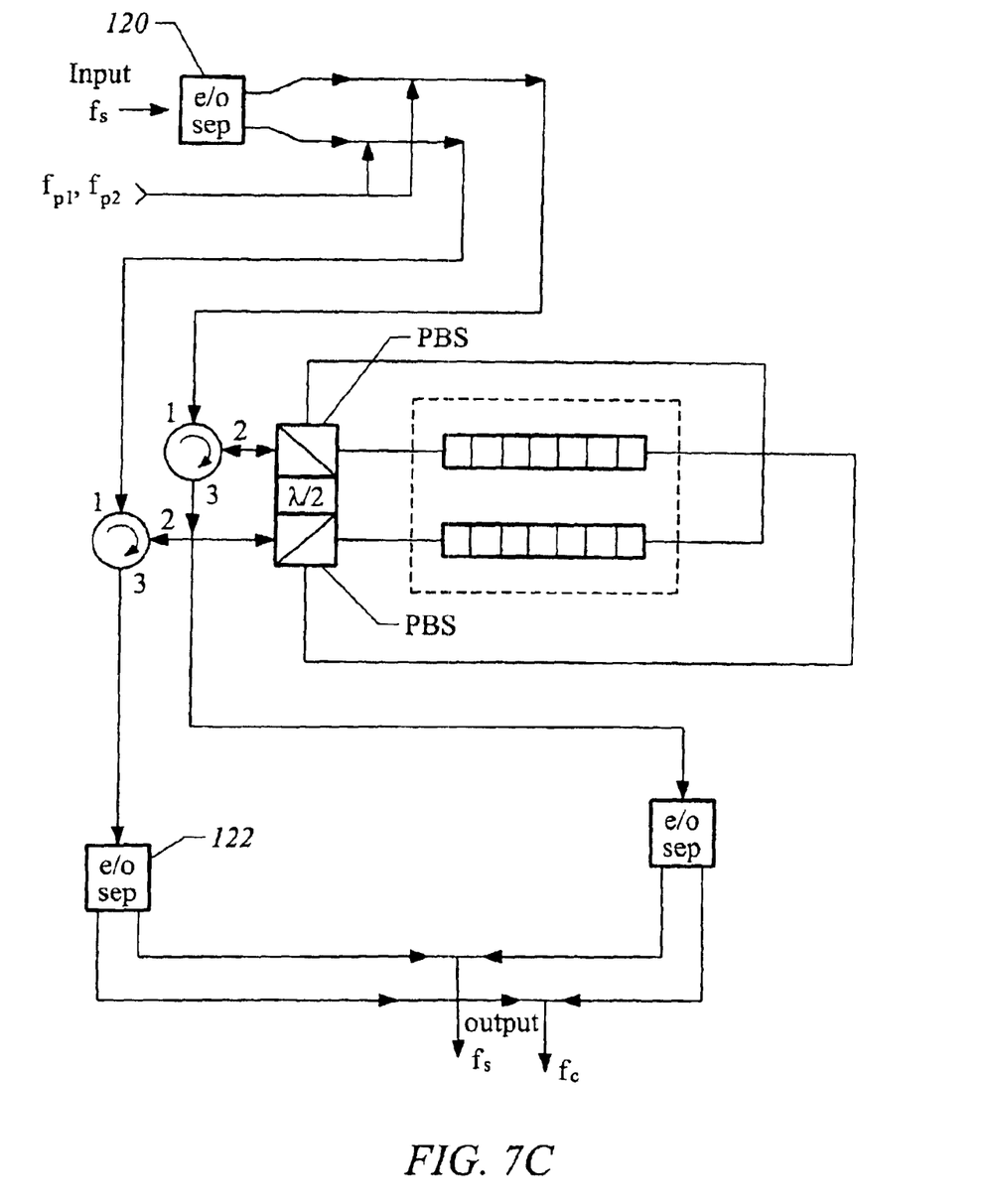

FIGS. 7A–7C depict the application of the polarization-insensitive integrated wavelength converters in a larger system, in this example, a filter system which provides separate outputs for the unconverted signal, i.e., the input signal, and the converted signal. A detailed description of such a filter is included in the co-pending, commonly assigned U.S. patent application Ser. No. 09/991,272, entitled "Optical Signal Converter with Filtered Output,"

and filed November 16, 2001 by Mark Sher and Robert Batchko. Generally stated, the described filter uses interferometric devices to separate alternating channel wavelengths, such as defined by the ITU (International Telecommunications Union), from each other. For convenience purposes, one set of communication channel wavelengths (or frequencies) is termed "even" and the other termed "odd." By properly selecting the frequency $f_p$ of the pump signal for DFG conversion, the input signals in one set of communication channels can be converted to output signals in another set of communication channels and an even/odd separator can be used to separate the input signals from the converted signals. More details can be found in the above-cited patent application. The present invention improves the efficiency of this filter system.

In the exemplary system shown in FIG. 7A, the even and odd input signals to an input even/odd separator 120 are optically coupled to first and second polarization-insensitive integrated wavelength converters 130*a* and 130*b* delineated by dotted lines. The arrangement of FIG. 1A is used as a representative of the polarization-insensitive integrated wavelength converters of the present invention. The outputs of these polarization-insensitive optical frequency synthesizers are respectively coupled to first and second output even/odd separators 122 and 124. The outputs of the first and second even/odd separators 122 and 124 are coupled so that the unconverted signal and converted signal are provided at separate output ports. Hence independent of their polarization, the input signals are converted to different wavelength channels. The converted signals at frequencies $f_c$ are also separated from the input signals at frequencies $f_s$.

FIGS. 7B and 7C illustrate different arrangements of the polarization-insensitive integrated wavelength converters of the present invention in the described filter system.

Figure 8:
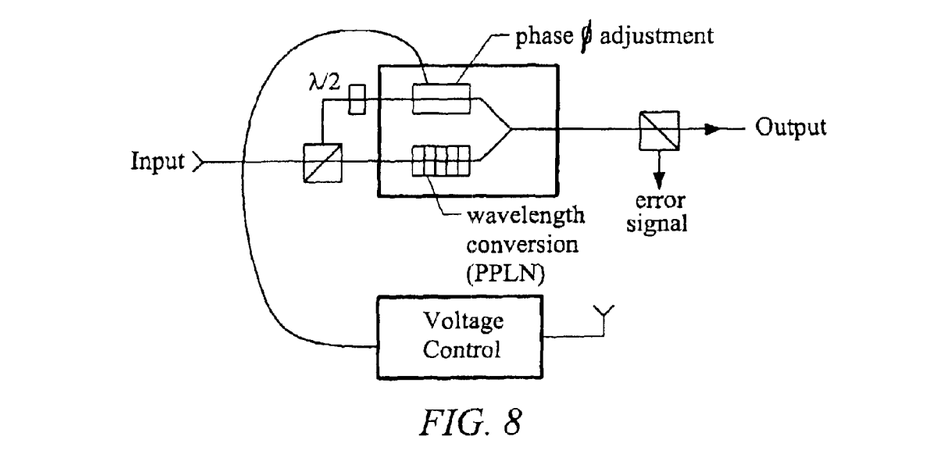
FIG. 8 illustrates a Mach-Zehnder structure which includes an electro-optic modulator for modifying the relative optical path length difference between the two polarization-specific waveguides.

FIG. 8 shows an alternative polarization-insensitive integrated wavelength converter in a single waveguide chip. As previously described, the phases of the two light components when combined at the output should be matched. In this case the polarization components are split into two waveguide arms, the incorrect polarization rotated by a half-wave plate, wavelength conversion is performed in at least one arm of the split waveguides, then the two components are recombined in a modified Mach-Zehnder structure (MZ). One arm of the MZ structure may include a high-voltage electrode. The electrode applies a refractive-index-changing electric field thereby controllably varying the optical path difference between the two arms of the MZ, serving to maintain in-phase constructive recombination of the fields in the two arms. An error signal may be tapped off of the orthogonal polarization for a feedback control. The orthogonal polarization is minimized to optimize the correct polarization. Since the telecom signals are very much faster than the variation of polarization in the system, a simple slow detector can be utilized to average out the variations due to signal rather than actual polarization change. This arrangement, as well as the other embodiments and pluralities thereof, can also be integrated onto the same chip as arrays of waveguides and wavelength converters.

The present invention provides for the integration polarization-insensitive wavelength converters. As described earlier, the wavelength converter has a first waveguide may support both TE and TM polarization modes, and a second waveguide supports substantially only the TM polarization mode. Fabrication processes utilizing titanium and annealed-proton-exchanged (APE) waveguides for supporting orthogonal polarization modes have been described in the literature. Further, zinc-diffused waveguides, or other waveguide materials including metals as known in the art, may be employed. The polarization beam splitter then separates un-polarized light into orthogonal TE and TM components.

For the half-wave plate, a cut may be introduced into the waveguide, or into both the waveguide and the substrate, into which a snug-fitting half-wave plate may be introduced. In this fashion, the half-wave plate rotates the polarization of the undesirable component by 90° to match the desirable polarization of the wavelength converter structure. One or more wavelength converter structures, i.e., the PPLN regions, may be employed in either or both of the waveguides. The two waveguides are then recombined to produce a single output. If the waveplate material is the same as that of the substrate (e.g., lithium niobate), then the optical path lengths of the two waveguides should be substantially identical and the recombined beams may add in-phase with minimal loss. A small correction for phase can be introduced by adding a voltage across a portion of one waveguide to vary the refractive index and hence the path length, as described with respect to FIG. 8. Alternatively, a second half-wave plate may be introduced into either of the waveguides downstream of the wavelength converter structure.

Figure 9:
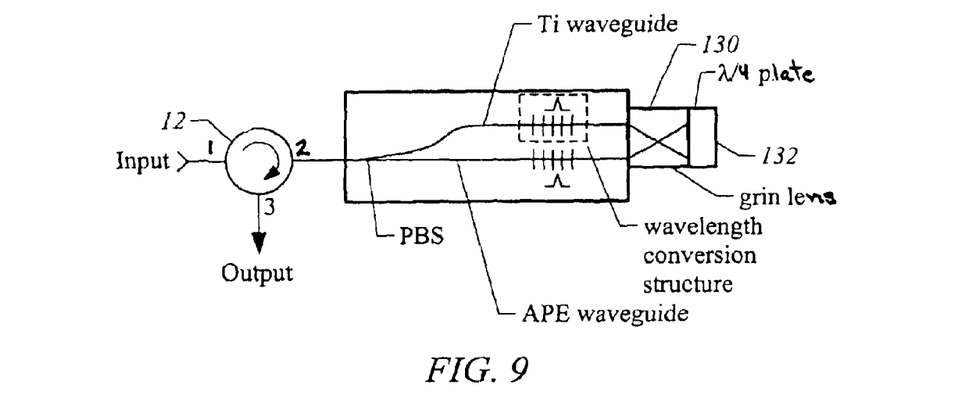
FIG. 9 illustrates how a GRIN lens is utilized to reflect and interchange the beams propagating through the waveguides of polarization-insensitive integrated wavelength converters of the present invention.

FIG. 9 illustrates another integrated approach is shown which utilizes a polarization beam splitter (PBS). As in the previous embodiments of the present invention, the polarization splitter may be comprised of differing waveguide materials that support orthogonal polarization modes. Additionally, a GRIN lens 130 may be configured to reflect and interchange the beams exiting each waveguide at the opposite end of the chip. A quarter-wave plate 132 rotates the reflected light by 90° (via two passes) and the GRIN lens 130 ensures the rotated components enter the appropriate waveguide which supports that polarization. At least one waveguide arm contains a wavelength converter structure. The reflected beams are then recombined at the input of the chip and may exit an input fiber via a circulator, as previously described.

Figure 10:
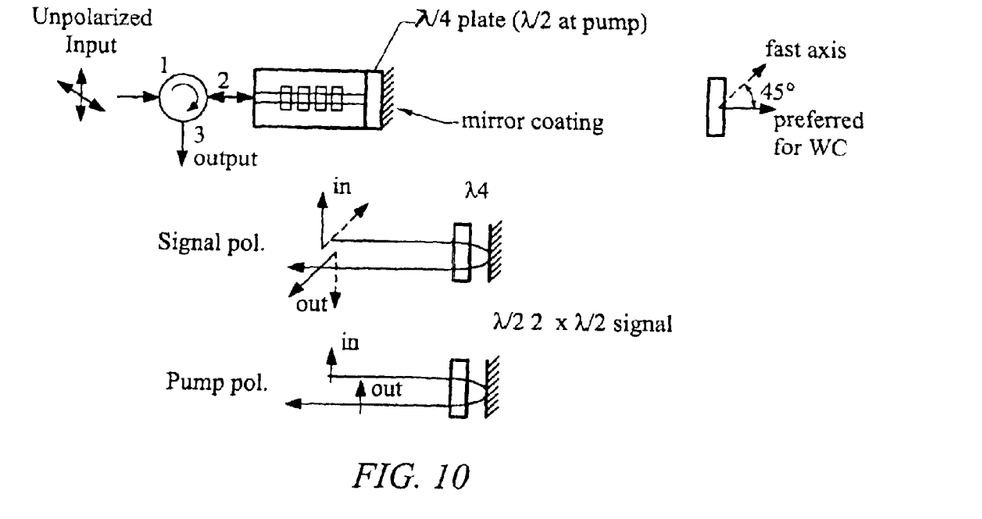
FIG. 10 illustrates how a waveplate and mirror, employed at the end of a waveguide that supports both polarization modes, allows unpolarized signal light to be converted via a double pass through the waveguide.

An alternative polarization diversity scheme is shown in FIG. 10. A quarter-wave plate is created, preferably in lithium niobate or the same material as the wavelength converter (WC), with its axis oriented 45 degrees to the preferred polarization direction of the WC. The waveguide material is chosen to support both TE and TM polarization modes. For example, metals such as titanium- or zinc-diffused waveguides in lithium niobate, as well as others known in the art, may be used. Since the two materials are identical, they can be butted together without index matching or subsequent losses. Furthermore, the waveguide can be fabricated into the combined substrate (i.e., WC and waveplate) so as to eliminate losses. The exterior surface of the waveplate is coated with a dielectric mirror coating reflecting the pump and signal wavelengths; this coating could also transmit the spectral region into which the converted output will be transmitted, thus eliminating the out-of-band amplified spontaneous emission (ASE) noise from an erbium doped fiber amplifier (EDFA). The waveplate causes a 90 degree rotation of the input signals, so that the polarization component that was optimal for the forward pass is flipped 90 degrees to the non-converting orientation, and vice versa. The pump is frequency-doubled within the waveguide, and the waveplate is fabricated to be quarter-wave in the 1550-nm band and half-wave at the frequency-doubled band (~780 nm). Thus the polarization of the frequency-doubled light is oriented at its original orientation on the roundtrip and can still pump the flipped polarization component of the signal light on the return pass.

Additionally, the pump source may be chosen to be a single-longitudinal-mode source with high phase correlation. The nonlinear gain for the WC is greatly reduced for signals with randomly varying phases; thus a single longitudinal mode ITU grid signal still converts with a high nonlinear gain, but random noise converts with a reduced gain. The advantage of this scheme is that it eliminates the fiber-to-chip coupling losses of other schemes and simplifies packaging into a single compact and monolithic unit. Ideally, if a WC is employed in every EDFA in the network, then the need for optical-electrical-optical (OEO) regenerators may be eliminated or restricted to ultra-long fiber spans. To this end, there is another noise enhancing characteristic utilizing spectral inversion.

Figure 11:
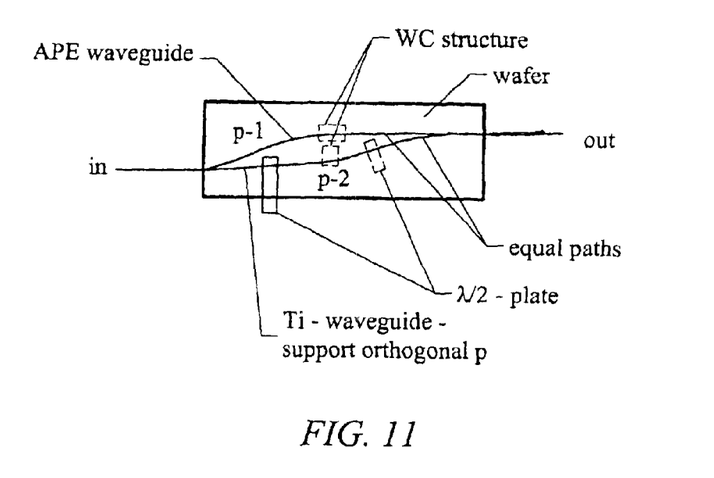
FIG. 11 illustrates how a half-wave plate, inserted into a saw-cut groove in the substrate, provides polarization rotation.

FIG. 11 shows a polarization diversity scheme in a polarization splitter is provided by two waveguides supporting two orthogonal polarization modes. In this fashion, a first waveguide may support both TE and TM polarization modes, and a second waveguide supports substantially only the TM polarization mode. A fabrication process utilizing Titanium and annealed-proton-exchanged (APE) waveguides for supporting orthogonal polarization modes is described by UTP. Further, Zinc-diffused waveguides, or other waveguide materials including metals as known in the art, may be employed. The polarization splitter then separates un-polarized light into orthogonal TE and TM components. A cut may be introduced into the waveguide, or into both the waveguide and the substrate, into which a snug-fitting half-wave plate may be introduced. In this fashion, the half-wave plate rotates the polarization of the undesirable component by 90 degrees to match the desirable polarization of the wavelength converter structure. One or more wavelength converter (WC) structures may be employed in either or both of the waveguides. The two waveguides are then recombined to produce a single output. If the waveplate material is the same as that of the substrate (e.g., lithium niobate), then the optical path lengths of the two waveguides will be substantially identical and the recombined beams may add in-phase with minimal loss. A small correction for phase can be introduced by adding a voltage across a portion of one waveguide to vary the refractive index and hence the path length. Alternatively, a second half-wave plate may be introduced into either of the waveguides downstream of the WC structure.

The invention has now been described with reference to the preferred embodiments. Alternatives and substitutions will now be apparent to persons of skill in the art. For example, in the above-described embodiments the optical processor is a difference frequency generator. However, various active and passive optical devices, such as an optical amplifier, can be substituted for the DFG. Additionally, in several embodiments particular polarization modes are described by way of example, not limitation. The invention is not dependent on particular polarization modes of the signal components. Accordingly, it is not intended to limit the invention except as provided by the appended claims.

What is claimed is:

1. A polarization-insensitive integrated wavelength converter comprising:
 a wavelength converter having first and second input/output ports on opposite sides of an optical path through said wavelength converter;
 a polarization separator having a first port for receiving an input optical signal, a second port providing a first component of the input optical signal in a first polarization mode, and a third port providing a second component of the input optical signal in a second polarization mode, with the second port of the polarization separator optically coupled to the first input/output port of the wavelength converter; and
 a polarization rotator coupling the third port of the polarization separator to the second input/output port of the wavelength converter that rotates the polarization mode of an optical signal propagating through the polarization rotator.

2. The apparatus of claim 1 wherein said polarization rotator comprises an electro-optic half-wave retarder.

3. The apparatus of claim 2 wherein said polarization rotator comprises a portion of a waveguide in a substrate and electrodes on said substrate near said waveguide portion.

4. The apparatus of claim 3 further including a mirror attached to said substrate so as to reflect back light from said waveguide.

5. The apparatus of claim 1 wherein said polarization rotator comprises a half-wave plate.

6. The apparatus of claim 1 wherein said polarization rotator comprises an electro-optic quarter-wave retarder.

7. The apparatus of claim 6 wherein said polarization rotator comprises a portion of a waveguide in a substrate and electrodes on said substrate near said waveguide portion.

8. The apparatus of claim 7 further including a mirror attached to said substrate so as to reflect back light from said waveguide.

9. The apparatus of claim 1 wherein said polarization rotator comprises a quarter-wave plate.

10. The apparatus of claim 1 wherein said polarization rotator comprises an optical fiber having a 90° twist to change the polarization mode.

11. The apparatus of claim 1 wherein said polarization rotator comprises:
 a plurality of light signal propagating paths;
 wherein said wavelength converter comprises:
 a plurality of processing channels, each having a first input/output port and a second input/output port each second input/output port coupled to a respective light signal propagating path; and
 wherein said polarization separator comprises:
 a plurality of channels coupled to the processing channels and light signal propagating paths.

12. The apparatus of claim 1 wherein at least a portion of said wavelength converter comprises a quasi-phasematched structure.

13. The apparatus of claim 12 wherein at least a portion of said quasi-phasematched structure is incorporated in lithium niobate.

14. The apparatus of claim 12 wherein at least a portion of said quasi-phasematched structure is incorporated in magnesium-oxide-doped lithium niobate.

15. The apparatus of claim 12 wherein at least a portion of said quasi-phasematched structure is incorporated in lithium tantalate.

16. The apparatus of claim 12 wherein at least a portion of said quasi-phasematched structure is incorporated in magnesium-oxide-doped lithium tantalate.

17. The apparatus of claim 1 wherein said wavelength converter comprises a waveguide structure.

18. The apparatus of claim 17 further wherein said waveguide structure includes a proton-exchanged waveguide.

19. The apparatus of claim 17 further wherein said waveguide structure includes an annealed-proton-exchanged waveguide.

20. The apparatus of claim 17 further wherein said waveguide structure includes a zinc-diffused waveguide.

21. The apparatus of claim 17 further wherein said waveguide structure includes a metal-diffused waveguide.

22. The apparatus of claim 17 further wherein said waveguide structure includes a titanium-diffused waveguide.

23. The apparatus of claim 17 further wherein said waveguide structure includes a buried waveguide.

24. The apparatus of claim 17 further wherein said waveguide structure includes a reverse-proton-exchange waveguide.

25. The apparatus of claim 1 further comprising an optical circulator having a port coupled to the first port of the polarization separator.

26. The apparatus of claim 1 wherein said polarization rotator couples the third port of the polarization to the second input/output port of the wavelength converter, and further comprising an electro-optic phase modulator alternatively coupled to the second port of said polarization separator and the first input/output port of the wavelength converter, or coupled to the third port of said polarization separator and the polarization rotator, for modifying the phase of at least one of the components of the optical signal.

27. The apparatus of claim 1 wherein input optical signal comprises a plurality of optical signals.

28. A polarization-insensitive integrated wavelength converter comprising:
 a substrate;
 a polarization separator serving to separate an input optical signal into first and second signal components having orthogonal polarization modes;
 a polarization rotator having a portion in said substrate serving to rotate the polarization mode of at least one of said first and second signal components;
 a wavelength converter structure in said substrate for receiving said signal components and generating converted signal components; and
 waveguides in said substrate carrying, first and second signal components to couple said polarization separator and said polarization rotator to said wavelength converter structure.

29. The apparatus of claim 28 in which said converted signal components comprise a frequency-converted input signal.

30. The apparatus of claim 28 in which said converted signal components comprise an amplified input signal.

31. The apparatus of claim 28 in which said input signal includes a pump signal.

32. The apparatus of claim 28 in which said converted signal components include a frequency-doubled pump signal.

33. The apparatus of claim 28 further comprising
 an optical circulator structure for providing isolation between the converted signal and an input signal source.

34. The apparatus of claim 33 wherein said circulator further comprises
 a first port coupled to said input signal source for receiving said input optical signal, a second port coupled to said polarization separator, and a third port for providing converted signal.

35. The apparatus of claim 33 wherein said circulator is integrated into said wavelength converter substrate.

36. The apparatus of claim 28 further comprising an input port for receiving and transmitting one or more input optical signals.

37. The apparatus of claim 28 wherein said polarization separator includes a first port for receiving said input optical signal, a second port for transmitting a first component of said input optical signal in a first polarization mode, and a third port for transmitting a second component of said input optical signal in a second polarization mode.

38. The apparatus of claim 28 wherein said polarization rotator includes a coupler for providing coupling between said polarization separator and said wavelength converter structure.

39. A polarization-insensitive integrated wavelength converter comprising:
 a substrate;
 a first waveguide, formed in said substrate, capable of supporting light signals in both TM and TE polarization modes and having first and second input/output ports;
 a second waveguide, formed in said substrate, capable of supporting light signals in at least one of the TM and TE polarization modes and having first and second coupling sections disposed near said first waveguide to evanescently couple light signals between said first waveguide and said second waveguide;
 a reflector coupled to the second input/output port of said first waveguide;
 a polarization rotator region disposed between the first and second coupling sections; and
 a wavelength converter region formed in at least one of the first waveguide and second waveguide
 whereby said reflector sends light signals from the second input/output port back into the second input/output port and said polarization rotator switches light signals in one polarization mode to the other polarization mode.

40. A polarization-insensitive integrated wavelength converter comprising:
 a substrate;
 a first waveguide, formed in said substrate, having first and second input/output ports;
 a second waveguide, formed in said substrate, having first and second coupling sections disposed near said first wave guide to evanescently couple light signals between the first waveguide and the second waveguide;
 a polarization rotator including a region disposed on the first waveguide
 a reflector coupled to the second input/output port of said first waveguide; and
 a wavelength converting structure formed in at least one of the first waveguide and second waveguide;
 whereby said reflector sends light signals from the second input/output port back into the second input/output port and said polarization rotator switches light signals in one polarization mode to the other polarization mode.

41. The apparatus of claim 40 wherein said first waveguide is capable of supporting optical signals having both TE and TM polarization modes.

42. The apparatus of claim 40 wherein said first waveguide includes a metal waveguide.

43. The apparatus of claim 40 wherein said first waveguide includes a buried waveguide.

44. The apparatus of claim 40 wherein said first waveguide includes a diffused waveguide.

45. The apparatus of claim 40 wherein said first waveguide includes a Zinc waveguide.

46. The apparatus of claim 40 wherein said first waveguide includes a Titanium waveguide.

47. The apparatus of claim 40 wherein said second waveguide includes a proton-exchanged waveguide.

48. The apparatus of claim 40 wherein said second waveguide includes an annealed-proton-exchanged waveguide.

49. The apparatus of claim 40 wherein said second waveguide includes a buried waveguide.

50. The apparatus of claim 40 wherein said polarization rotator includes a wave plate.

51. The apparatus claim 40 wherein said polarization rotator includes a quarter-wave plate.

52. The apparatus of claim 40 wherein said polarization rotator includes a half-wave plate.

53. The apparatus of claim 40 wherein said polarization rotator includes an electro-optic wave plate.

54. The apparatus of claim 53 wherein said polarization rotator includes electrodes positioned near the region of said first waveguide.

55. The apparatus of claim 40 wherein said polarization rotator region is positioned between said first coupling section and said second coupling section.

56. The apparatus of claim 40 wherein said polarization rotator region is positioned between said second coupling section and said reflector.

57. The apparatus of claim 40 wherein said polarization rotator includes a waveplate inserted into a saw cut in said substrate.

58. The apparatus of claim 40 wherein said polarization rotator includes a waveplate fastened to the end of said substrate.

59. The apparatus of claim 40 wherein said polarization rotator includes a waveplate fastened between the end of said substrate and said reflector.

60. The apparatus of claim 40 wherein said reflector serves to reflect said input signals.

61. The apparatus of claim 40 wherein said reflector serves to reflect said converted signals.

62. The apparatus of claim 40 wherein said reflector serves to reflect pump signals.

63. The apparatus of claim 40 wherein said reflector serves to reflect frequency-doubled pump signals.

64. The apparatus of claim 40 wherein said wavelength converting structure includes a ferroelectric crystal.

65. The apparatus of claim 40 wherein said wavelength converting structure includes a periodically-poled ferroelectric crystal capable of performing quasi-phasematching.

66. The apparatus of claim 40 wherein said wavelength converting structure includes lithium niobate.

67. The apparatus of claim 40 wherein said wavelength converting structure includes magnesium-doped lithium niobate.

68. The apparatus of claim 40 wherein said wavelength converting structure includes congruent lithium niobate.

69. The apparatus of claim 40 wherein said wavelength converting structure includes stoichiometric lithium niobate.

70. The apparatus of claim 40 wherein said wavelength converting structure includes lithium tantalate.

71. The apparatus of claim 40 wherein said wavelength converting structure includes magnesium-doped lithium tantalate.

72. The apparatus of claim 40 wherein said wavelength converting structure includes congruent lithium tantalate.

73. The apparatus of claim 40 wherein said wavelength converting structure includes stoichiometric lithium tantalate.

74. The apparatus of claim 40 further including an electro-optic index modulator positioned near at least one of first waveguide and second waveguide, said modulator serving to control the optical path length of waveguides near said modulator.

75. A polarization-insensitive integrated wavelength converter comprising:

a wavelength converter, having a gain level, for receiving component input signals and generating component converted signals, a polarization separator for separating an input signal into component input signals having orthogonal polarization modes, a polarization rotator for rotating the polarization modes of said component input signal and optical signal propagating through the polarization rotator, and an interchannel crosstalk modulator, comprising a detector and modulator structure, serving to detect levels of interchannel crosstalk between wavelength-converted optical signals whereby one or more of the amplitude of input optical signals and converter gain level are modified accordingly to reduce interchannel cross-talk.

76. The apparatus of claim 75 wherein said wavelength converter includes controls for modifying the gain level of at least one of said converted signal, said input signal and a pump signal.

77. The apparatus of claim 76 wherein said controls include an optical parametric amplifier for providing said gain level.

78. The apparatus of claim 76 wherein said controls include an EDFA for providing said gain level.

79. The apparatus of claim 76 wherein said controls include a pump diode for providing said gain level.

80. The apparatus of claim 76 wherein said controls include a semiconductor optical amplifier for providing said gain level.

81. The apparatus of claim 76 wherein said controls include an optical attenuator.

82. The apparatus of claim 75 further including an optical filter structure for discriminating between said input signals, said converted signals, pump signals and non-converted signals.

83. The apparatus of claim 82 wherein said optical filter structure includes at least one optical interleaver.

84. The apparatus of claim 82 wherein said optical filter structure includes at least one arrayed waveguide.

85. A polarization-insensitive integrated wavelength converter comprising:

a polarization separator having a first port for receiving an input optical signal, optically coupled to the input/output port of the wavelength converter, a second port providing a first component of the input optical signal in a first polarization mode, and a third port providing a second component of the input optical signal in a second polarization mode, a wavelength converting structure having a first port and a second port on opposite sides of an optical path through said wavelength converting structure, said first port being coupled to the second port of the polarization separator, serving to provide wavelength conversion on said input optical signal, a polarization rotator coupling the second port of the wavelength converting structure to the third port of the polarization separator, serving to rotate the polarization of the said input signal.

86. A polarization-insensitive integrated wavelength converter comprising:

a polarization separator having two or more waveguides that support orthogonal polarization modes of an input signal, said waveguides formed in a substrate;

a wavelength converting structure formed in the substrate, said wavelength converting structure serving to provide wavelength conversion on said input optical signal; and a polarization rotator formed in the substrate, said polarization rotator serving to rotate the polarization of the said input signal.

87. The apparatus of claim 86 further including a coupler serving to optically couple the waveguides.

88. A polarization-insensitive integrated wavelength converter comprising:

a waveguide that supports an input signal having a plurality of polarizations, a wavelength converting structure, serving to provide wavelength conversion on at least one polarization mode of said input optical signal;

a polarization rotator, serving to rotate the said plurality of polarizations of the said input signal; and a reflector serving to reflect said input signal back through said wavelength converting structure.

89. A polarization-insensitive integrated wavelength converter comprising:

at least one polarization separator comprising a first waveguide that supports an input signal having a plurality of polarizations, and a second waveguide that supports at least one polarization mode of said input signal;

a wavelength converting structure serving to provide wavelength conversion on at least one polarization mode of said input optical signal; and a polarization rotator, serving to rotate the polarizations of said input signal in at least one of first or second waveguides.

90. A polarization-insensitive integrated wavelength converter comprising:

at least one polarization separator comprising a first waveguide that supports an input signal having a plurality of polarizations, and a second waveguide that supports one polarization mode of said input signal;

a wavelength converting structure, serving to provide wavelength conversion on at least one polarization mode of said input optical signal; and a lens, wave plate and reflector assembly serving to optically couple said first and second waveguides.

91. The apparatus of claim 90 wherein said wavelength conversion structure further comprises an optical frequency synthesizer, serving to provide frequency translation on said input signals.

92. A polarization-insensitive integrated wavelength converter comprising:

an optical circulator;

a substrate;

a waveguide, formed in said substrate, capable of supporting both TM and TE polarization modes and having first and second input/output ports;

a polarization rotator region disposed at the second input/output port;

a reflector coupled to said polarization rotator region; and a wavelength converter region formed in the waveguide.

93. A polarization-insensitive integrated wavelength converter comprising:

a substrate;

a waveguide, formed in said substrate, capable of supporting both TM and TE polarization modes and having first and second input/output ports;

a polarization rotator region disposed at the second input/output port;

a reflector coupled to said polarization rotator region; and a wavelength converter region formed in the waveguide.

* * * * *